Patented Nov. 24, 1925.

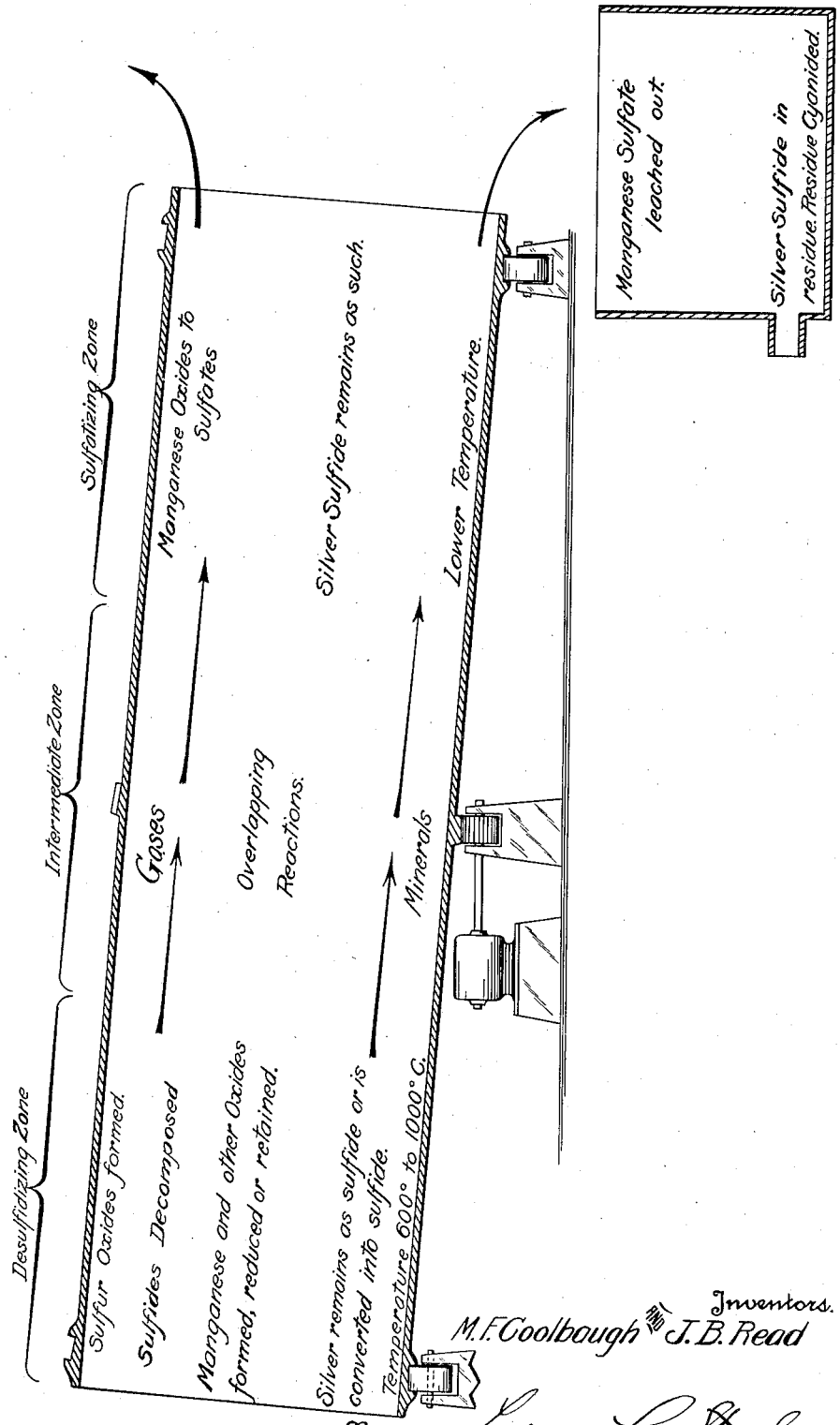

1,562,942

UNITED STATES PATENT OFFICE.

MELVILLE F. COOLBAUGH AND JOHN BURNS READ, OF GOLDEN, COLORADO, ASSIGNORS TO THE COMPLEX ORES RECOVERIES COMPANY, OF DENVER, COLORADO, A CORPORATION OF COLORADO.

PROCESS FOR TREATING MANGANESE-SILVER ORES.

Application filed March 4, 1922. Serial No. 541,079.

*To all whom it may concern:*

Be it known that we, MELVILLE F. COOLBAUGH and JOHN BURNS READ, citizens of the United States, and residents of Golden, in the county of Jefferson, State of Colorado, have invented certain new and useful Improvements in Processes for Treating Manganese-Silver Ores; and we do declare the following to be a full, clear, and exact description of the invention, such as will enable others skilled in the art to which it appertains to make and use the same, reference being had to the accompanying drawings, which form a part of this specification.

The object of this invention primarily is to recover silver from manganese-silver ores, this object being attained by so treating the ores that the silver is rendered amenable to recovery by known methods. As the process is carried out, the recovery of the manganese also, becomes a secondary object.

Heretofore the recovery of silver from manganese-silver ores by cyanidation has been decidedly difficult, very low extractions having been obtained by direct treatment. If, however, the manganese is reduced, and especially if it is rendered soluble and separated from the silver, the silver then is efficiently dissolved by the cyanide. Many methods have been proposed both for the reduction and the solution of the manganese and some very high recoveries of silver from the residues have been effected. For low grade ores, however, the costs of such methods have generally been prohibitive.

We have discovered that manganese in manganese-silver ores can be reduced or changed to sulfate, which is soluble in water, by roasting the ore with pyrite or with other sulfides or with elemental sulfur. For an efficient change to sulfate it is necessary that the ore and sulfur mineral together with the air for roasting and the products of the roast travel together in the same direction throughout the entire treatment.

The manganese ores to which this method of treatment will apply are more particularly oxides and especially the higher oxides, but carbonates and silicates are also susceptible to the treatment to render the manganese soluble. Throughout this specification and the claims, the term "ore" is intended to include concentrates, tailings and other metalliferous matter as well as raw ores.

The process may be carried out in any suitable type of furnace. In the accompanying drawings one type of roasting furnace is indicated diagrammatically, the steps and reactions of the process being also indicated.

If the reduction of the manganese alone is desired, the manganese mineral with the sulfide or sulfur are charged into the furnace together and only a limited amount of air introduced. The sulfur reacts with the oxygen of the higher oxides causing a reduction which is illustrated by the following equation:

$$S + 2MnO_2 = SO_2 + 2MnO.$$

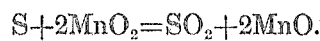

The manganese remains as an insoluble compound with the residue, and the silver is in a condition for extraction with cyanide.

In order to form soluble manganese, it is necessary that the ore mixed with the sulfide or sulfur mineral should travel in the same direction throughout the entire treatment with the air and gaseous products of the roast. Under these circumstances an excess of air is employed and the manganese is converted as completely as possible into the sulfate. The calcine is treated with water alone or with water and sulphuric acid to remove any soluble sulfates, and the residue is treated with cyanide for the extraction of silver. The manganese or other soluble sulfates may be recovered from the solution by crystallization. The chemical changes which take place in the furnace and in the leaching are in some respects similar to those set forth in our co-pending application Serial No. 340,888 filed November 26, 1919.

In the first zone of the furnace the ore, the sulfide or sulfur mineral, and the air for roasting are introduced. If the quantity of sulfur is not sufficient to give the heat required in the furnace, fuel or heat in some other form must be employed. In this zone the greatest desulfidizing takes place, and some metallic oxides form. Sulfur dioxide first formed reacts with the excess of air present to form sulfur trioxide. The rate of this reaction is materially influenced by the presence of ferric oxide (Fe$_2$O$_3$), manganese dioxide (MnO$_2$) and to a lesser extent by other oxides. The sulfur trioxide formed may react with some of the metallic oxides to form sulfates. In this zone the temperature is maintained between 600° C. and 1000° C., depending somewhat upon the minerals in the ore being handled.

In the second or central zone of the furnace more sulfide is decomposed and more sulfur trioxide and some sulfates are formed.

In the third or final zone, small quantities of sulfides are still being decomposed and large quantities of sulfates are formed.

The temperature in the second zone may be about the same as that in the first zone. Such temperature will depend largely upon the minerals being treated. The temperature in the third zone is lower than that in the second zone, and in the case of formation of manganese sulfate should be below the decomposition point of this salt.

Silver is one of the metals which holds sulfide sulfur very tenaciously, and if other sulfide sulfur is not completely oxidized during the roast the silver remains as an insoluble sulfide. In this form it can be dissolved in cyanide. If the sulfur has been very completely oxidized, the silver will be in the form of sulfate which is soluble in water or sulfuric acid. Under these circumstances, if it is desired to keep the silver with the residue a small quantity of a soluble chloride or a soluble sulfide may be added to precipitate the silver, the silver being subsequently recovered from the residue by cyanide treatment.

The amount of sulfide or sulfur to be mixed with the manganese ore will vary with the manganese content. An amount of sulfur slightly in excess of that necessary to react with the manganese to form sulfate, should be present. Thus, the retention of silver as sulfide may be insured.

We claim:

1. A process of treating ores containing silver, manganese and sulfides, comprising treating the ores at a temperature and for such a length of time as will insure roasting of sulfides other than silver sulfide and at the same time prevent a dead roast so as to insure retention of silver sulfide, advancing the minerals and liberated gases together in the same direction, and lowering the temperature below the decomposition temperature of manganese sulfate for the action of sulfur gases on the manganese mineral to form manganese sulfate.

2. A process of treating ores containing silver, manganese and sulfides, comprising treating the ores at one step at a temperature to roast certain sulfides and under conditions to retain silver sulfide, advancing the ores and liberated gases together in the same direction, and lowering the temerature for the action of sulfur gases on the manganese mineral to form manganese sulfate.

3. A process of treating silver-manganese ores containing sulfides, comprising treating the ores at a temerature high enough to roast sulfides other than silver sulfide and at least as high as the decomposition temperature of manganese sulfate, and under conditions to prevent decomposition of silver sulfide, advancing the ores and liberated gases together in the same direction, and lowering the temperature for the action of sulfur gases on the manganese mineral to form manganese sulfate.

4. A process of treating ores containing silver, manganese and sulfides, comprising treating the ores at a temperature to roast sulfides other than silver sulfide and at least as high as the decomposition temperature of manganese sulfate and in an atmosphere containing sulfur sufficient to prevent decomposition of silver sulfide, advancing the ores and liberated gases together in the same direction, and lowering the temperature for the action of sulfur gases on the manganese mineral to form manganese sulfate.

5. A process of treating silver-manganese ores containing sulfur comprising roasting the ores and liberating sulfur gases, treating the roasted ores with said gases and forming manganese sulfate thereby, and removing the manganese sulfate from the residue with a solvent.

6. The method of treating a manganese silver ore which comprises passing ore sulphur-containing material and air through a furnace in the same direction, and discharging the ore with the manganese in the manganous condition.

7. The method of treating a manganese silver ore which comprises passing ore sulphur-containing material and air through a furnace in the same direction, converting the manganese to the manganous condition, and discharging the ore with the silver as a sulphide.

8. The method of treating a manganese silver ore which comprises passing the ore through a furnace in contact with sulphur-containing material an oxidizing reagent, converting the manganese to the manganous condition, and discharging the ore with the silver as a sulphide.

9. The method of treating a manganese silver ore which comprises adding a sulphur containing substance to the ore, passing the mass and air through a furnace, converting the manganese to a manganous condition, discharging the treated mass with the silver as a sulphide, and subjecting the mass to a leaching operation.

10. The method of treating a manganese silver ore which comprises adding a sulphur containing substance to the ore, passing the mass and air through a furnace, forming manganese sulphate, and discharging the mass with the silver as a sulphide.

11. The method of treating a manganese silver ore which comprises adding a sulphur containing substance to the ore, passing the mass and air in the same direction through a furnace, forming manganese sulphate, discharging the mass with the silver as a sulphide, and leaching out the manganese sulphate.

12. The method of treating a manganese silver ore sulphur-containing material, which comprises passing the ore and air through a furnace, converting the manganese to the manganous condition, and discharging the treated mass with silver as a sulphur containing compound.

13. The method of treating a manganese silver ore, which comprises passing the ore sulphur-containing material and air through a furnace, converting the manganese to the manganous condition, discharging the mass from the furnace, extracting soluble matter with dilute sulphuric acid, recovering metallic values from the solution, and treating the residue with a silver extracting reagent.

14. The method of treating a manganese silver ore which comprises passing ore sulphur-containing material and air through a furnace in the same direction, reducing manganese compounds to a low state of oxidation, discharging the treated ore, extracting soluble compounds with aqueous reagents, and recovering metal compounds from the aqueous solution.

15. The method of treating a manganese silver ore which comprises adding a sulphur-containing substance to the ore, passing the mass and air through a furnace in the same direction, converting the manganese to the manganous condition, discharging the mass from the furnace, extracting soluble matter with dilute sulphuric acid, and treating the residue with a solvent for silver sulphide.

In testimony whereof we affix our signatures.

MELVILLE F. COOLBAUGH.
JOHN BURNS READ.